US011144842B2

(12) United States Patent
Das et al.

(10) Patent No.: US 11,144,842 B2
(45) Date of Patent: Oct. 12, 2021

(54) MODEL ADAPTATION AND ONLINE LEARNING FOR UNSTABLE ENVIRONMENTS

(71) Applicant: Robert Bosch GmbH, Stuttgart (DE)

(72) Inventors: Subhro Das, Broadview, IL (US); Prasanth Lade, Palo Alto, CA (US); Soundar Srinivasan, Sunnyvale, CA (US); Rumi Ghosh, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 610 days.

(21) Appl. No.: 15/346,707

(22) Filed: Nov. 8, 2016

(65) Prior Publication Data

US 2017/0206469 A1 Jul. 20, 2017

Related U.S. Application Data

(60) Provisional application No. 62/280,877, filed on Jan. 20, 2016, provisional application No. 62/280,884, filed on Jan. 20, 2016.

(51) Int. Cl.
*G06N 20/00* (2019.01)
*G05B 17/02* (2006.01)
(Continued)

(52) U.S. Cl.
CPC ........... *G06N 20/00* (2019.01); *G05B 13/048* (2013.01); *G05B 17/02* (2013.01);
(Continued)

(58) Field of Classification Search
CPC ............................... G06N 20/00; G05B 13/048
See application file for complete search history.

(56) References Cited

U.S. PATENT DOCUMENTS 7,054,706 B2   5/2006   Kempf et al.
7,209,799 B2   4/2007   Agapiou et al.
(Continued)

OTHER PUBLICATIONS

Gama et al, "A survey on concept drift adaptation", Jan. 2013, ACM Computing Surveys vol. 1, pp. 1-35. (Year: 2013).*
(Continued)

*Primary Examiner* — Michael J Huntley
*Assistant Examiner* — Clint Mullinax
(74) *Attorney, Agent, or Firm* — Michael Best & Friedrich LLP

(57) ABSTRACT

Methods, systems, and apparatuses for adapting a predictive model for a manufacturing process. One method includes receiving, with an electronic processor, a plurality of data points for a plurality of manufactured parts and the predictive model. The predictive model outputs a label for a manufactured part provided by the manufacturing process indicating whether the manufactured part is accepted or rejected. The method also includes estimating, with the electronic processor, a drift for each of the plurality of data points and generating, with the electronic processor, an adapted version of the predictive model based on the predictive model and the drift for each of the plurality of data points. In addition, the method includes outputting, with the electronic processor, a label for each of the plurality of manufactured parts using the adapted version of the predictive model.

17 Claims, 8 Drawing Sheets

(51) Int. Cl.
  *G05B 13/04* (2006.01)
  *G05B 23/02* (2006.01)
  *G06N 5/02* (2006.01)
(52) U.S. Cl.
  CPC ......... *G05B 23/0254* (2013.01); *G06N 5/022* (2013.01); *G05B 2219/37518* (2013.01)

(56) References Cited

U.S. PATENT DOCUMENTS

| | | | |
|---|---|---|---|
| 7,483,868 B2* | 1/2009 | Meng | G06N 3/082 706/26 |
| 7,548,793 B2 | 6/2009 | Eichblatt et al. | |
| 7,752,152 B2 | 7/2010 | Paek et al. | |
| 8,017,411 B2 | 9/2011 | Sonderman et al. | |
| 8,145,337 B2 | 3/2012 | Lin et al. | |
| 8,364,627 B2 | 1/2013 | Canny et al. | |
| 8,374,981 B2 | 2/2013 | Shigemori | |
| 10,163,061 B2* | 12/2018 | Grove | G06N 20/00 |
| 2005/0288812 A1* | 12/2005 | Cheng | G05B 19/41875 700/109 |
| 2007/0225835 A1 | 9/2007 | Zhu | |
| 2008/0254544 A1* | 10/2008 | Modzelewski | G01N 33/48771 436/43 |
| 2009/0024356 A1* | 1/2009 | Platt | G16H 50/20 702/181 |
| 2010/0020208 A1* | 1/2010 | Barbu | G06K 9/40 348/250 |
| 2011/0288837 A1* | 11/2011 | Blevins | G05B 17/02 703/6 |
| 2013/0151442 A1* | 6/2013 | Suh | G06N 3/008 706/12 |
| 2013/0325774 A1* | 12/2013 | Sinyavskiy | G06N 3/049 706/23 |
| 2013/0338808 A1* | 12/2013 | Baseman | G05B 19/41875 700/97 |
| 2014/0222503 A1 | 8/2014 | Vijayaraghavan et al. | |
| 2014/0297002 A1 | 10/2014 | Ji | |
| 2015/0066467 A1* | 3/2015 | Acar | G06F 17/5036 703/14 |
| 2015/0141520 A1* | 5/2015 | Kandi | A61K 9/1611 514/653 |
| 2016/0070950 A1* | 3/2016 | Chen | G06K 9/00147 382/133 |
| 2017/0140298 A1* | 5/2017 | Wabnig | G06N 3/0445 |
| 2017/0205815 A1* | 7/2017 | Wegner | G05B 11/42 |
| 2017/0248943 A1* | 8/2017 | Galarneau | G05B 23/0213 |

OTHER PUBLICATIONS

Hofer, "Adapting a classification to local and global shift when only unlabeled data are available", 2015, European Journal of Operational Rsearch, 243, pp. 177-189. (Year: 2015).*
International Search Report for Application No. PCT/EP2017/050975 dated Apr. 3, 2017 (5 pages).
Translation of National Intellectual Property Administration, P.R. China First Office Action for Application No. 2017800185724 dated Jul. 3, 2020 (14 pages).

* cited by examiner

MODEL ADAPTATION AND ONLINE LEARNING FOR UNSTABLE ENVIRONMENTS

RELATED APPLICATIONS

This application claims priority to U.S. Provisional Application Nos. 62/280,877 and 62/280,884 both filed Jan. 20, 2016, the entire content of each is incorporated by reference herein.

FIELD

Embodiments of the present invention relate to methods, systems, and apparatuses for updating or tuning predictive models.

BACKGROUND

Discovering underlying trends in a dynamic or unstable environment is a challenging problem. An unstable environment may include an environment where underlying conditions leading to an observation are not static across time. Such a scenario often occurs in the assembly lines of the manufacturing industry during the ramp-up phase of a product. Each product churned out of the assembly line is tested and classified to be good or bad. However, during the ramp-up phase, there are continuous modifications made to the manufacturing environment. As a consequence, the production rate of good parts might be continuously changing. Usually, one of the important objectives during the ramp-up phase is to increase the production volume of good parts while at the same time reduce the time for testing products. Data mining can be used in such scenarios and some of the tests can be replaced by predictive models. In other words, the target variable of the predictive models can be the results of the test, and instead of conducting the tests, the results of the tests can be predicted using the models leading to saving of time. Also, predictive models can help better understand the process, which may lead to an increase in yield. However, in the current state of the art, these models do not adapt themselves automatically to the changes in the underlying environment. In addition, it may be difficult to know when a change has occurred that requires model adaptation and, in some embodiments, underlying changes may be sporadic leading to the need for model adaptation and online learning.

SUMMARY

As one example, a number of test measurements may be generated along a manufacturing line. Some of these test measurements can be used to determine whether a particular part (e.g., an assembled product) should be accepted or rejected (e.g., and designated as scrap). A predictive model may be used to make this determination based on the test measurements. Such a predictive model may be trained using historical data for the manufacturing line (e.g., test measurements and corresponding labels indicating whether a particular part was accepted or rejected). However, over time the predictive model may become out-of-date and provide inaccurate determinations of whether a particular part should be accepted or rejected.

Accordingly, embodiments of the invention relate to methods and systems for performing automatic model adaptation and online learning in unstable environments. In some embodiments, adapted predictive models may relate to manufacturing lines. To adaptively tune such a predictive model, test measurements generated along the manufacturing line may be fed to an adaptive tuning system (e.g., computer hardware executing a set of instructions) that uses the test measurements to adapt or tune the predictive model and keep the model updated.

One embodiment provides a method of adapting a predictive model for a manufacturing process. The method includes receiving, with an electronic processor, the predictive model. The predictive model outputs a label for a manufactured part provided by the manufacturing process, wherein the label indicates whether the manufactured part is accepted or rejected. The method also includes receiving, with the electronic processor, a plurality of data points associated with a plurality of manufactured parts and estimating a drift for each of the plurality of data points. The method also includes generating, with the electronic processor, an adapted version of the predictive model based on the predictive model and the drift for each of the plurality of data points, and outputting, with the electronic processor, a label for each of the plurality of manufactured parts using the adapted version of the predictive model.

Another embodiment provides a system for adapting a predictive model for a manufacturing process. The system includes a database storing a plurality of data points associated with a plurality of manufactured parts and a controller communicatively coupled to the database. The controller including an electronic processor configured to receive the plurality of data points associated with the plurality of manufactured parts and the predictive model. The predictive model outputs a label for a manufactured part provided by the manufacturing process, wherein the label indicates whether the manufactured part is accepted or rejected. The electronic processor is also configured to estimate a drift for each of the plurality of data points and generate an adapted version of the predictive model based on the predictive model and the drift for each of the plurality of data points. The electronic processor is further configured to output a label for each of the plurality of manufactured parts using the adapted version of the predictive model.

Yet another embodiment provides a non-transitory computer-readable medium containing instructions, that when executed by an electronic processor, perform a set of functions. The set of functions including receiving the predictive model, a predictive model outputting a label for a manufactured part provided by a manufacturing process indicating whether the manufactured part is accepted or rejected. The set of functions also includes receiving a plurality of data points associated with a plurality of manufactured parts and estimating a drift for each of the plurality of data points. In addition, the set of functions includes generating an adapted version of the predictive model based on the predictive model and the drift for each of the plurality of data points, and outputting a label for each of the plurality of manufactured parts using the adapted version of the predictive model.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A plurality of hardware and software based devices, as well as a plurality of different structural components may be used to implement embodiments of the invention. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on a non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (e.g., a system bus) connecting the components.

The methods and systems described herein may be applied to various industries, commercial practices, and processes that use predictive modeling to track data and predict outcomes. For example, the methods may apply to a manufacturing process, web usage, user interest analytics, natural language processing, spam detection, and analysis of financial, climatological, and medical data. The methods may also apply to calculating energy demand and predictive pricing. The methods may also apply to analysis of signals from autonomous robots. In general, the methods may apply to systems that are configured to track data (e.g., data points) and determine a change in the data over time, which may be referred to as data drift. For example, in predictive analytics and machine learning, concept drift means that the statistical properties of the target variable, which the model is trying to predict, changes over time in unforeseen ways. This causes problems because the predictions become less accurate as time passes. Accordingly, embodiments of the invention provide methods and systems for performing model adaptation and online learning under concept drift. Although the methods may be applied to various processes and industries, this application focuses on applying the methods within a manufacturing environment as one example.

Figure 1:
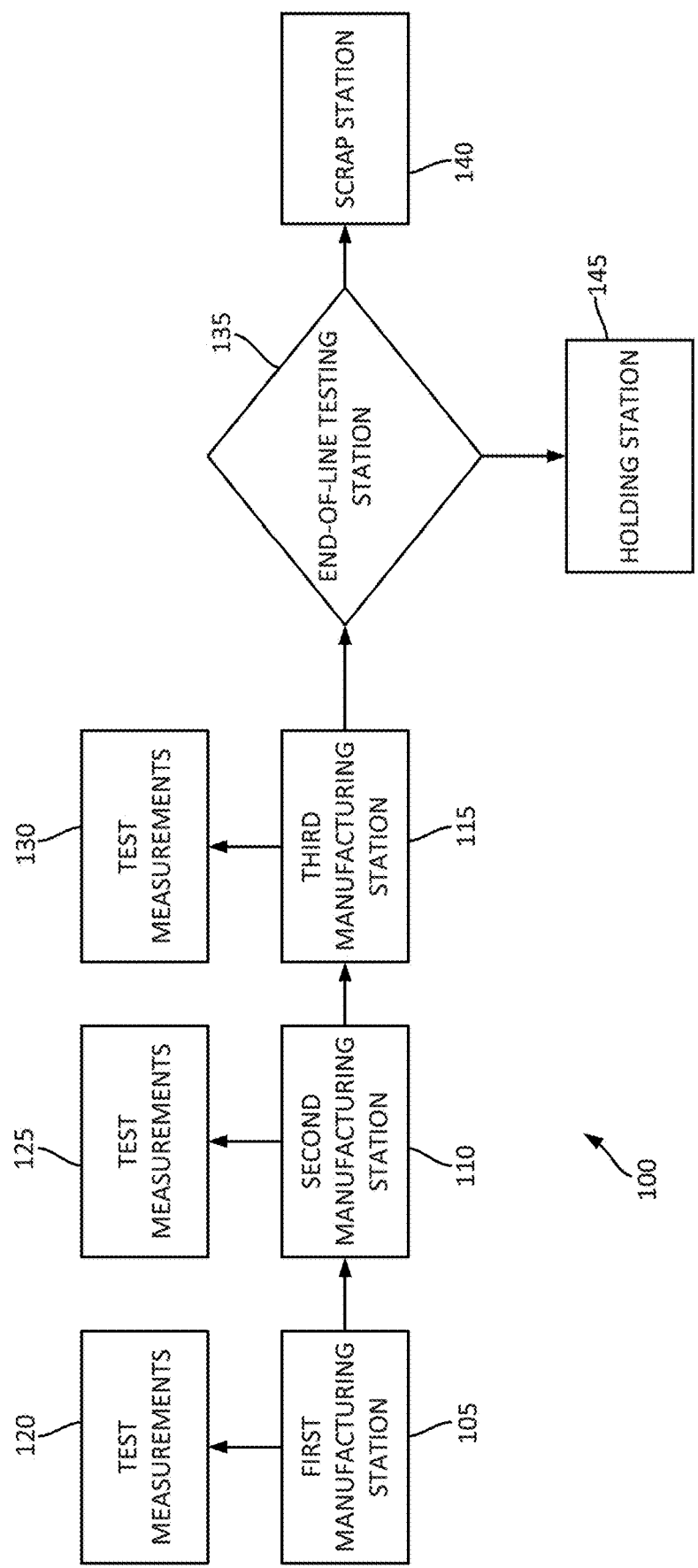
FIG. 1 is a block diagram of a manufacturing process including a plurality of testing stations.

FIG. 1 illustrates a manufacturing process 100 with a plurality of manufacturing stations. As illustrated in FIG. 1, the plurality of manufacturing stations may include a first manufacturing station 105, a second manufacturing station 110, and a third manufacturing station 115. Each of the manufacturing stations performs a process step in the development of a manufactured part. For example, the first manufacturing station 105 may mold or form a manufactured part, the second manufacturing station 110 may drill or punch holes in the manufactured part, and the third manufacturing station 115 may combine parts from other stations (e.g., substations) to form a completed manufactured part. The manufacturing process 100 may include various types and styles of assembly and manufacturing steps. For example, the manufacturing process 100 may be implemented with an assembly line (e.g., using machined components), by segmented machining processes, and the like. The illustration and associated description provides just one example of the manufacturing process 100 and other examples and embodiments of a manufacturing process may be used with the methods described herein.

Each manufacturing station may be associated with one or more test measurements 120, 125, 130 measuring characteristics or features of one or more parts being processed at the manufacturing station, such as width, height, length, weight, skew, curvature, strength, temperature, and the like. Therefore, the test measurements represent data points indicative of the measured characteristics. The test measurements may be output by one or more sensors associated with a manufacturing station. Although not illustrated in FIG. 1, the test measurements may be stored to a database system, such as manufacturing execution system (MES), log data or text files, or other types of database systems or storage mechanisms.

The manufacturing process 100 also includes one or more end-of-line testing stations 135. Each end-of-line testing station may perform one or more tests on a manufactured part to determine whether the part is within specifications or tolerances. When not within specifications, the manufactured part may pass to a scrap station 140 to be scraped or otherwise reworked. If within specifications, the manufactured part may pass to a holding station 145 for further processing, testing, shipping, and the like. Labels associated with manufactured part indicating whether the part was accepted or scrap may be stored to a database system, such as a MES. The end-of-line testing stations may be included at the end of the manufacturing process 100 as illustrated in FIG. 1 or may be included throughout the manufacturing process 100 at one or more locations.

Figure 2:
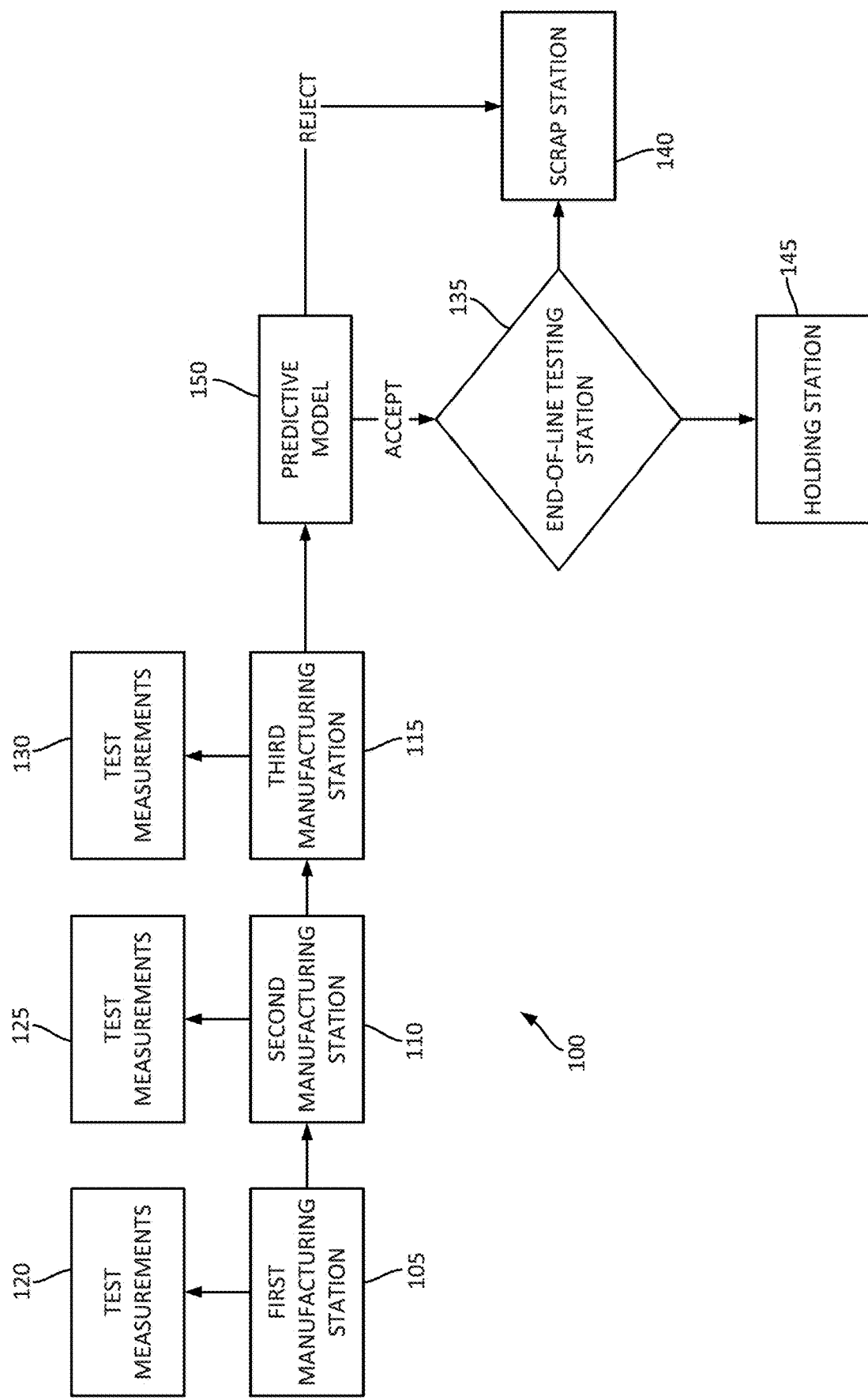
FIG. 2 is a block diagram of the manufacturing process of FIG. 1 including a predictive model according to one embodiment.
Figure 3A:
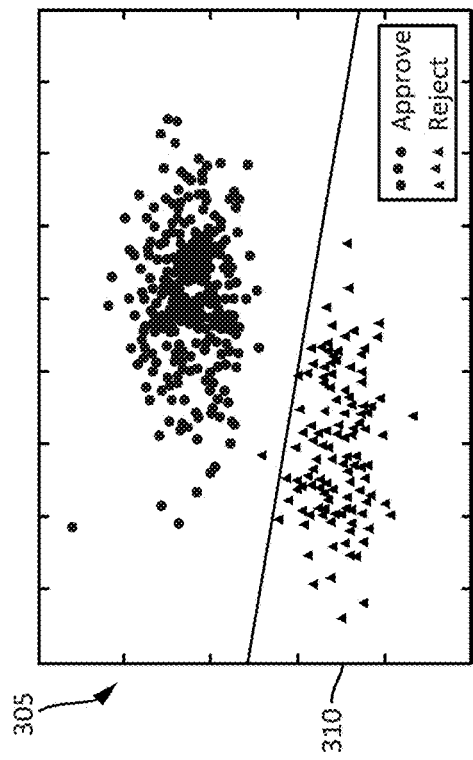
FIGS. 3A-3D graphically illustrate a plurality of data points drifting over a period of time.
Figure 3B:
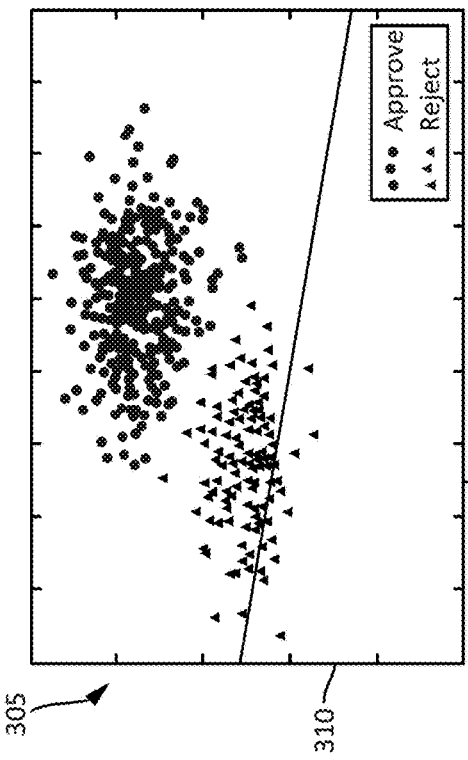
Figure 3C:
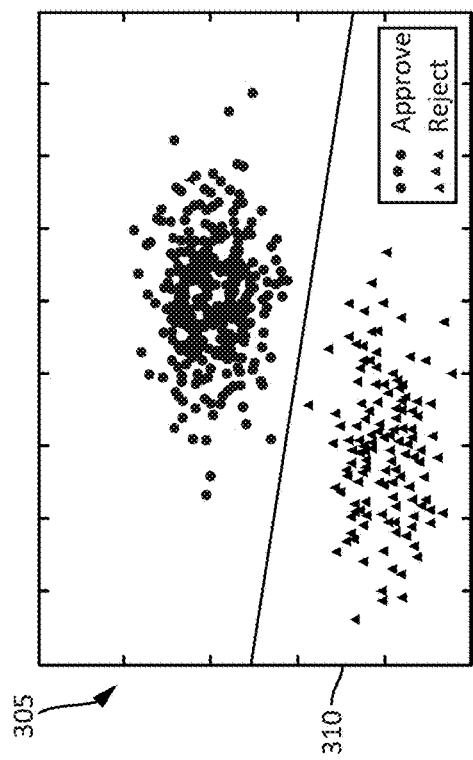
Figure 3D:
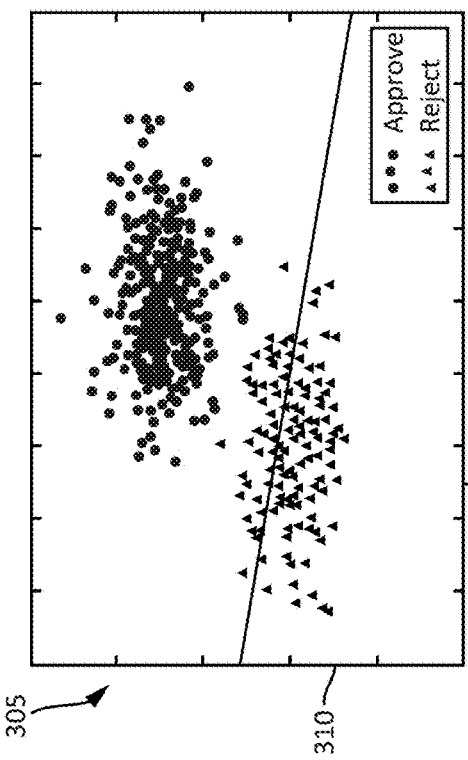

To reduce time and costs associated with the manufacturing process 100, one or more predictive models can be used to supplement or replace one or more of the end-of-line testing stations 135. For example, FIG. 2 illustrates the manufacturing process 100 with the addition of a predictive model 150 (executed by a computing device). The predictive model provides an output or label for each part manufactured by the manufacturing process 100 indicating whether the part should be accepted ("accept") or rejected ("reject") based on the test measurements 120, 125, 130, or a combination thereof. In some embodiments, as illustrated in FIG. 2, when the predictive model 150 labels a part as "reject," the part undergoes no further testing (e.g., is scrapped), but when the predictive model 150 labels a part as "accept," the part may undergo additional testing through the one or more end-of-line testing stations 135. Therefore, fewer tests are performed by the end-of-line testing stations 135, which reduces time and costs associated with the manufacturing process 100.

In some embodiments, the predictive model 150 is generated using machine learning. Machine learning generally refers to the ability of a computer program to learn without being explicitly programmed. In some embodiments, a computer program (e.g., a learning engine) is configured to construct an algorithm based on example inputs. Supervised learning involves presenting a computer program with example inputs and their desired (e.g., actual) outputs. The computer program is configured to learn a general rule (e.g., an algorithm) that maps the inputs to the outputs. Machine learning can be performed using various types of methods and mechanisms. For example, machine learning can be performed using decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics.

Accordingly, for the example manufacturing process 100 described above, the predictive model 150 may be generated or trained by providing the predictive model 150 with the test measurements 120, 125, and 130 and the labels determined by the end-of-line testing stations 135. Therefore, the predictive model 150 develops algorithms that map particular test measurements to particular labels and, after being trained, output a label based on a provided input. For example, the predictive model 150 may generate a probability that a manufactured part will be accepted or rejected. These probabilities may be associated with labels, such as "accept" or "reject," for a manufactured part. Thus, as noted above, once the predictive model 150 is trained, the predictive model may supplement or replace one or more of the end-of-line testing stations 135, which makes the manufacturing process 100 faster and cheaper.

However, the test measurements may drift over time (e.g., due to changes in input, machine wear, adjustments to manufacturing processes (e.g., tack times and workflows), manufacturing environment changes, and other variables). As a consequence, over time the predictive model 150 may become inaccurate. For example, FIGS. 3A-3D illustrate a drift in data points over sequential periods of time. Each data point is plotted based on a first value and a second value. The first value is illustrated on the vertical axis 310 and the second value is illustrated on the horizontal axis 315. The first value and the second value of the data point may represent test measurements for a particular part (e.g., a height and width) associated with one or more of the manufacturing stations. A threshold 305 is illustrated in FIGS. 3A-3D that represents a simplified boundary or algorithm that may be applied by the predictive model 150 to identify accepted parts and rejected parts. For example, the predictive model 150 may "reject" any part represented by a point below the threshold 305 and "accept" any part represented by a point above the threshold 305. As illustrated in FIGS. 3A-3D, the threshold 305 representing the predictive model 150 remains constant although the data drifts. Therefore, over time, the predictive model 150 may become out of date and inaccurate and the benefits gained from the predictive model 150 are reduced. Also, since some parts may be rejected based on the output from the predictive model 150, an actual label (e.g., as determined by an end-of-line testing station 135) may not be available for each part produced by the manufacturing process 100. Therefore, a new predictive model may not be able to be generated to accurately accommodate the data drift.

Figure 4:
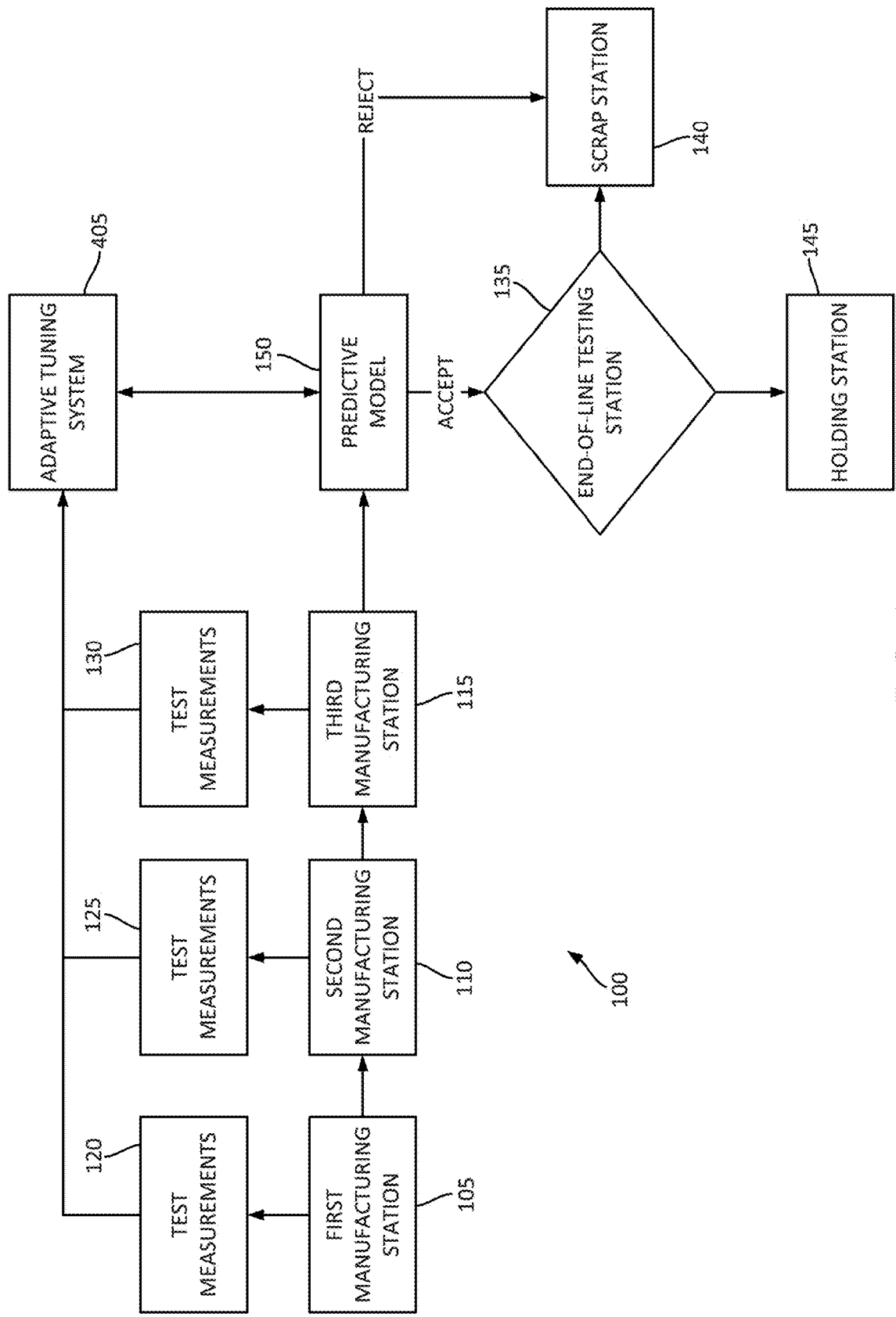
FIG. 4 is a block diagram of the manufacturing process of FIG. 1 including a predictive model and an adaptive tuning system according to one embodiment.
Figure 5:
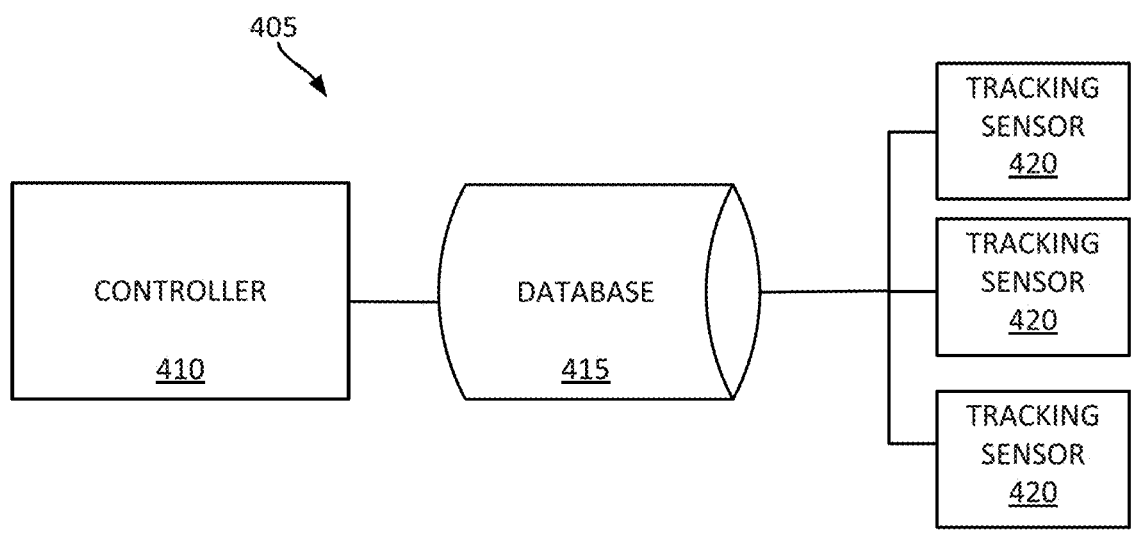
FIG. 5 is a block diagram of the adaptive tuning system of FIG. 4 according to one embodiment.

To account for the above technical problems associated with a predictive model (e.g., drift), the manufacturing process 100 may include an adaptive tuning system 405 for adapting the predictive model 150 as illustrated in FIG. 4. FIG. 5 schematically illustrates the adaptive tuning system 405 according to one embodiment. The adaptive tuning system 405 includes a controller 410, a database 415 (e.g., a manufacturing execution system ("MES") database), and one or more tracking sensors 420. The adaptive tuning system 405 may include different components than illustrated in FIG. 5. For example, in some embodiments, the adaptive tuning system 405 may include multiple databases, multiple controllers, fewer or additional tracking sensors, or a combination thereof. Also, in some embodiments, the database 415 may be included in the controller 410.

The tracking sensors 420 may record the test measurements 120, 125, and 130 described above. The tracking sensors 420 are communicatively coupled to the database 415. In some embodiments, the tracking sensors 420 are also communicatively coupled to the controller 410. The database 415 receives and stores data from the tracking sensors 420. The database 415 may communicate with the tracking sensors 420 over a wired connection, a wireless connection, or a combination thereof. For example, in some embodiments, the database 415 may communicate with some of the tracking sensors 420 over a wired connection and may communicate with some of the tracking sensors 420 over a wireless connection. In some embodiments, the database 415 communicates with one or more of the tracking sensors 420 (over a wired or wireless connection) over a communication network, such as the Internet, a mesh network, a cellular network, a private network, a public network, or a combination thereof. Also, in some embodiments, one or more intermediary devices may manage communication between the tracking sensors 420 and the database 415. For example, one or more intermediate devices may communicate with the tracking sensors 420 and forward data received from the tracking sensors 420 to the database 415 (e.g., with or without processing). In particular, in some embodiments, the tracking sensors 420 may communicate with the controller 410, and the controller 410 may forward data received from the tracking sensors 420 (e.g., with or without processing) to the database 415. In some embodiments, the database 415 also stores labels (when output by the predictive model or provided by an end-of-line testing station 135) associated with the test measurements as described above. In some embodiments, the database 415 may also store the predictive model 150. For example, in some embodiments, the controller 410 is configured to train the predictive model 150, execute the predictive model 150, adapt the predictive model 150, or a combination thereof. In other embodiments, the predictive model 150 is executed by one or more controllers distinct from the controller 410.

The database 415 also communicates with the controller 410. The database 415 may communicate with the controller 410 over a wired connection, a wireless connection, or a combination thereof. For example, in some embodiments, the database 415 communicates with the controller 410 (over a wired or wireless connection) over a communication network, such as the Internet, a mesh network, a cellular network, a private network, a public network, or a combination thereof. Also, in some embodiments, one or more intermediary devices may manage communication between the controller 410 and the database 415. For example, one or more intermediary devices may communicate with the controller 410 and forward data received from the controller 410 to the database 415 and vice versa (e.g., with or without processing). Also, as noted above, in some embodiments, the database 415 is included in the controller 410.

Figure 6:
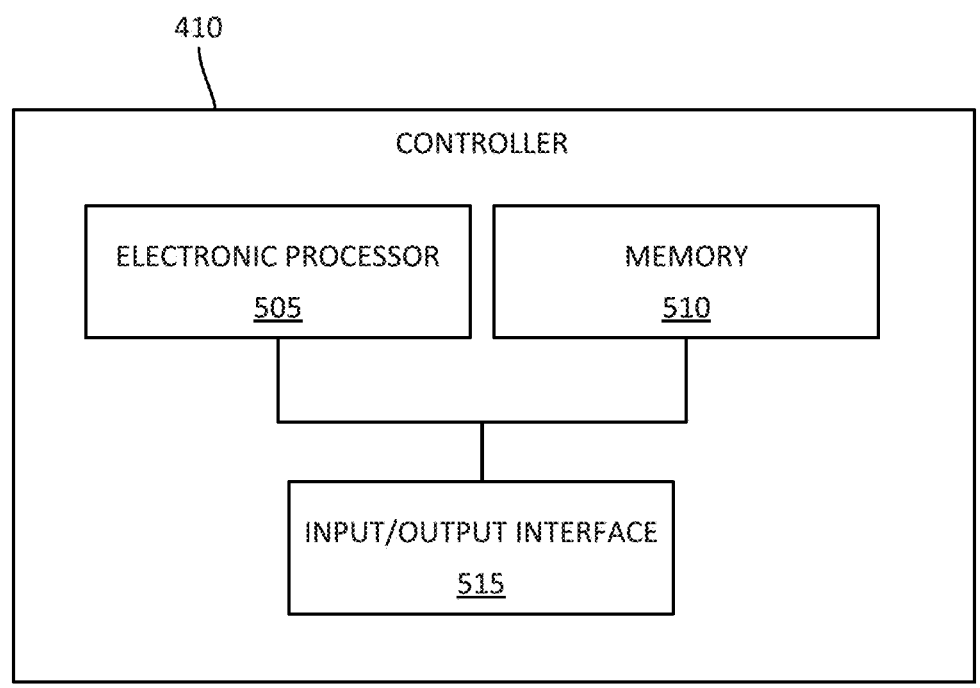
FIG. 6 is a block diagram of a controller of the adaptive tuning system of FIG. 5 according to one embodiment.

The controller 410 includes a plurality of electrical and electronic components that provide power, operational control, and protection of the components within the controller 410. For example, as illustrated in FIG. 6, the controller 410 may include an electronic processor 505 (e.g., a microprocessor, application-specific integrated circuit (ASIC), or another suitable electronic device), a memory 510 (e.g., a non-transitory, computer-readable storage medium), and an input/output interface 515. The electronic processor 505, the memory 510, and the input/output interface 515 communicate over one or more connections or buses. The controller 410 illustrated in FIG. 6 represents one example of a controller and embodiments described herein may include computing devices with additional, fewer, or different components than the controller 410 illustrated in FIG. 6. Also, in some embodiments, the controller 410 performs functionality in addition to the functionality described herein. Similarly, the functionality performed by the controller 410 (i.e., through execution of instructions by the electronic processor 505) may be distributed among multiple controllers. Accordingly, functionality described herein as being performed by the electronic processor 505 may be performed by one or more electronic processors included in the controller 410 or external to the controller 410.

The memory 510 of the controller 410 may include a program storage area and a data storage area. The program storage area and the data storage area may include read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, a secure digital ("SD") card, other suitable memory devices, or a combination thereof. The electronic processor 505 executes computer-readable instructions ("software") stored in the memory 510. The software may include firmware, one or more applications, program data, filters, rules, one or more program modules, and other executable instructions. For example, the software may include instructions and associated data for adapting the predictive model 150 as described herein.

The input/output interface 515 allows the controller 410 to communicate with devices external to the controller 410. For example, the controller 410 may communicate with the database 415 through the input/output interface 515. In particular, the input/output interface 515 may include a port for receiving a wired connection to the database 415 (e.g., a universal serial bus ("USB") cable and the like), a transceiver for establishing a wireless connection to the database 415 (e.g., over a communication network, such as the Internet, a local area network ("LAN"), a wide area network, and the like), or a combination thereof. Furthermore, in some embodiments, the controller 410 may communicate with the tracking sensors 420 through the input/output interface 515. In some embodiments, the controller 410 also receives input from one or more peripheral devices, such as a keyboard, a pointing device (e.g., a mouse), buttons on a touch screen, a scroll ball, mechanical buttons, and the like through the input/output interface 515. Similarly, in some embodiments, the controller 410 provides output to one or more peripheral devices, such as a display device (e.g., a liquid crystal display ("LCD"), a touch screen, and the like), a printer, a speaker, and the like through the input/output interface 515. In some embodiments, output may be provided within a graphical user interface ("GUI") (e.g., generated by the electronic processor 505 from instructions and data stored in the memory 510 and presented on a touch screen or other display) that enables a user to interact with the controller 410.

The controller 410 using the electronic processor 505 executes instructions (e.g., stored in the memory 510) to perform adaptation of the predictive model for the manufacturing process 100. In particular, the controller 410 using the electronic processor 505 may execute instructions to perform the method illustrated in FIG. 7, the method illustrated in FIG. 8, or both.

Figure 7:
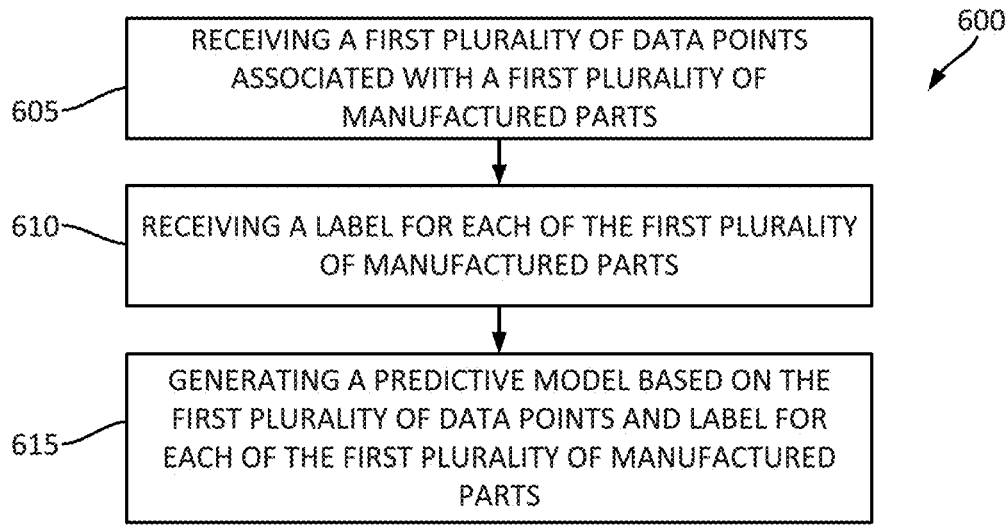
FIG. 7 is a flowchart of a method of generating a predictive model according to one embodiment.

FIG. 7 illustrates a method 600 of generating (i.e., training) the predictive model 150 according to one embodiment. The method 600 is described herein as being performed by the controller 410 and, in particular, the electronic processor 505. However, as noted above, in some embodiments, the controller 410 may only adapt a predictive model 150 as described in FIG. 8 and one or more separate controller similar to the controller 410 may generate the predictive model 150.

The method 600 includes receiving a first plurality of data points associated with a first plurality of manufactured parts (block 605). The first plurality of data points may include the test measurements detected by the tracking sensors 420 and transmitted to the database 415 for recording, storage, and use by the electronic processor 505.

The method 600 also includes receiving a label for each of the first plurality of manufactured parts (block 610). The electronic processor 505 then generates a predictive model based on the first plurality of data points and the label for each of the first plurality of manufactured parts (at block 615).

Once trained, the predictive model 150 may be used to predict a label for manufactured parts based on test measurements associated with the manufactured parts. In particular, as described above, the predictive model 150 (as executed by the electronic processor 505) outputs a label (y) for a manufactured part representing a class that a part (or its associated data points) belongs to (e.g., "accept" or "reject"). As described above, the predictive model 150 may predict a probability that a manufactured part is within one or more specifications.

For example, in some embodiments, the trained predictive model includes estimated probability distributions ($P(y|x)$) that is trained based on data points at time t, which have available labels or classifications. However, at a subsequent time (t+1), new data points are available but not their labels. Furthermore, although the trained model may be used to estimate a label for the new data points, the predictive power of the model decreases over time due to data drift. In some embodiments, drift can be modeled either assuming all or some of the distributions ($P(x)$, $P(y)$, $P(y|x)$, or $P(x|y)$) are changing. These assumptions may depend on the problem at hand.

In particular, as described above, once trained, the predictive model 150 may become out-of-date and, hence, inaccurate. Furthermore, as the predictive model 150 may be used to avoid processing a manufactured part at an end-of-line testing station 135, an actual label (i.e., not determined by the predictive model 150 but determined by one or more of the end-of-line testing stations 135) may not be available that could otherwise be used to generate a new, updated predictive model.

Figure 8:
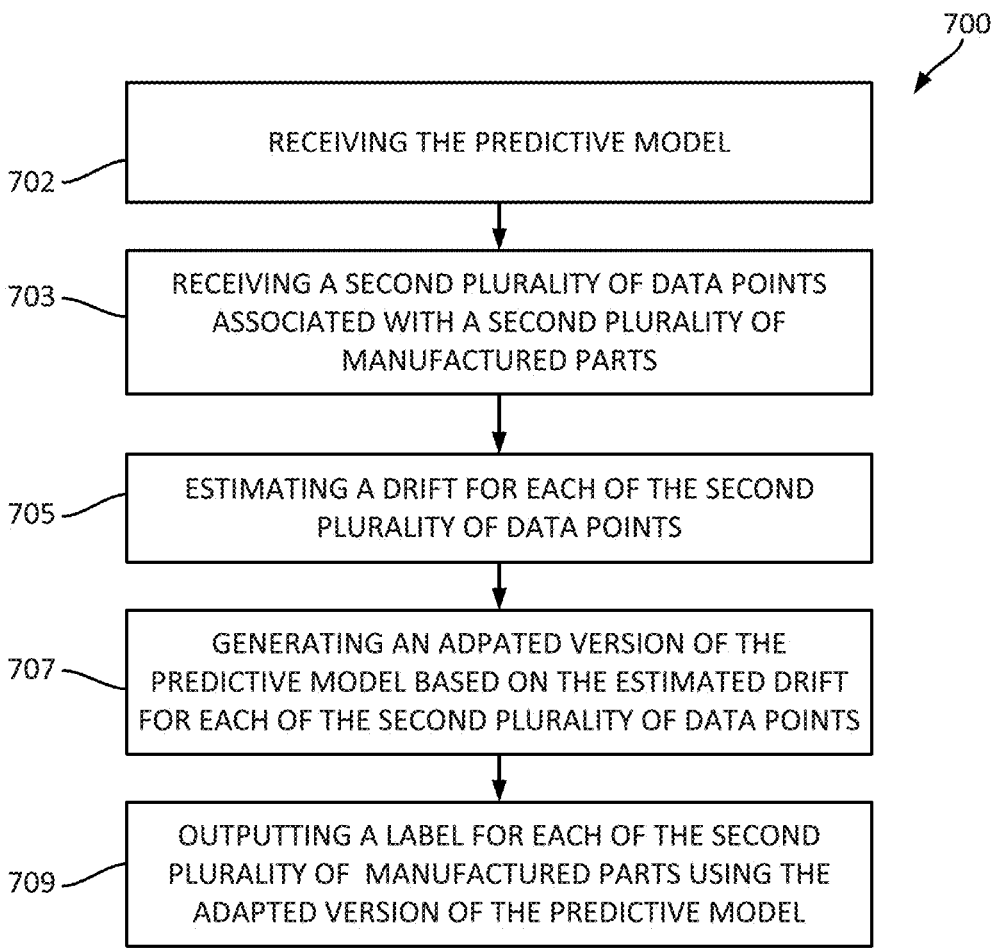
FIG. 8 is a flowchart of a method of adapting a predictive model according to one embodiment.

Accordingly, to address the above and other technical problems, FIG. 8 illustrates a method 700 of adapting the predictive model 150 according to one embodiment. The method 700 is performed by the controller 410 and, in particular, the electronic processor 505. As illustrated in FIG. 8, the method 700 includes receiving the predictive model 150 (at block 702). When the controller 410 also generates the predictive model 150, the controller 410 may receive the predictive model 150 by accessing the predictive model 150 stored in the memory 510. In other embodiments, the controller 410 may receive the predictive model 150 by accessing memory external to the controller 410 (e.g., through the input/output interface 515).

The method 700 also includes receiving a second plurality of data points associated with a second plurality of manufactured parts ($x_i$), wherein the second plurality of data points represents the drifted data (at block 703). The method 700 also includes estimating a drift for each of the second plurality of manufactured parts (at block 705). The drift for each of the second plurality of manufactured parts may be estimated based on the second plurality of data points and the predictive model 150 as previously determined. The drift for each of the second plurality of manufactured parts is then used to generate an adapted version of the predictive model (also referred to herein as the adapted predictive model) (at block 707). The method 700 also includes outputting a label for each of the second plurality of manufactured parts based on the adapted version of the predictive model (at block 709).

Figure 9:
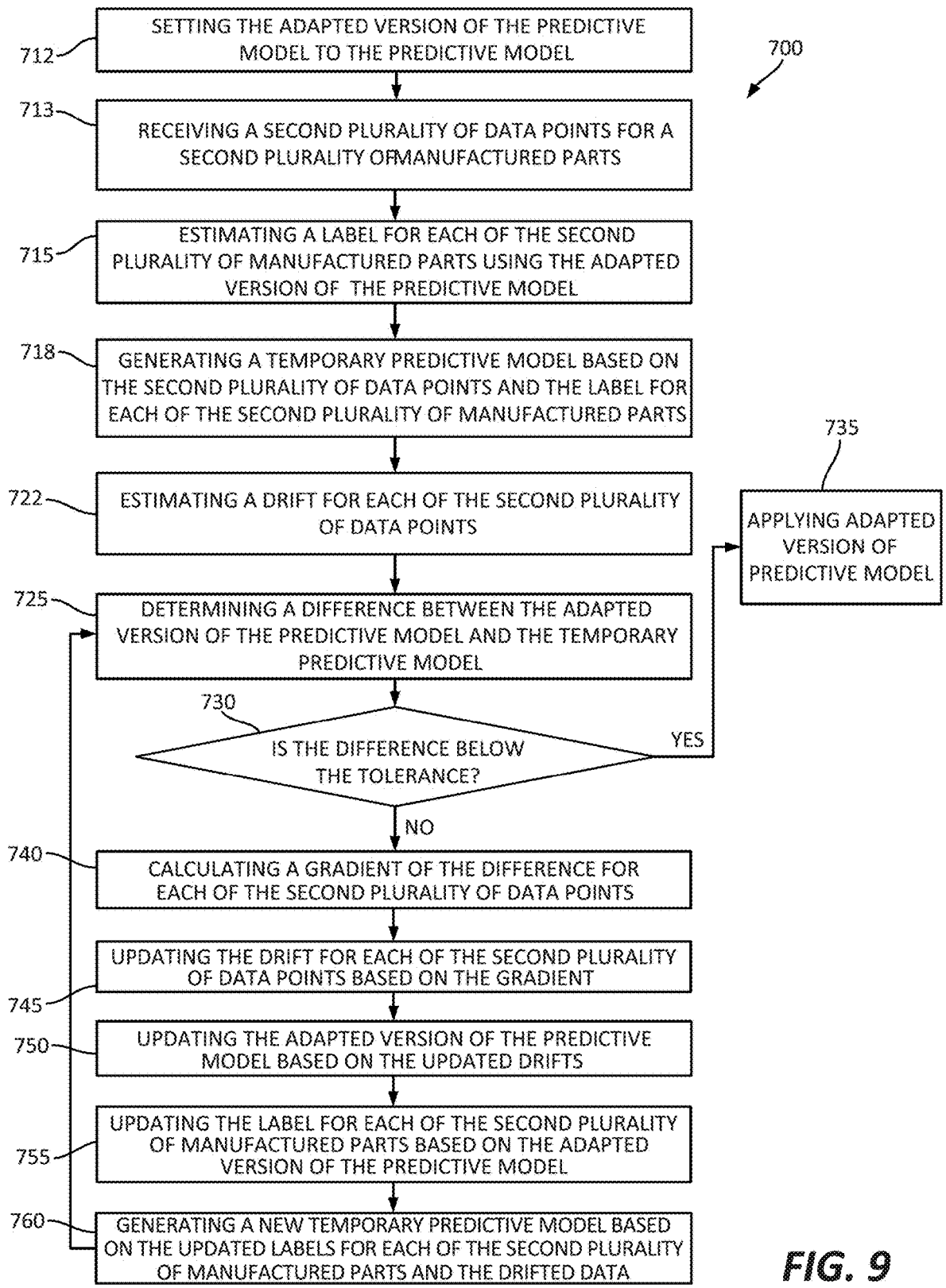
FIG. 9 is a flowchart providing details of the method of FIG. 8 according to one embodiment.

Further details of the method 700 according to one embodiment are provided in FIG. 9. Since portions of the method 700 may be iterative, the method 700 may include an initialization sequence for startup of the method 700. In particular, initialization may include initializing the adapted version of the predictive model. For example, as illustrated in FIG. 9, the method 700 may include setting the adapted version of the predictive model to the predictive model 150 for the initial iteration (at block 712). In addition, initializing the adaptive tuning may include initializing a counter (e.g., variable k) to a reference number (e.g., zero) to track the iterations. Other mechanisms for tracking iterations may be used in other embodiments. Similarly, initializing the adaptive tuning process may include defining a tolerance. As described in more detail below, the tolerance may be used to check the accuracy of an adapted version of the predictive model 150.

The method 700 also includes receiving the second plurality of data points associated with a second plurality of manufactured parts ($x_i$), wherein the second plurality of data points represents the drifted data (at block 713). The electronic processor 505 then estimates a plurality of labels for each of the second plurality of manufactured parts ($\hat{y}_i^k$) based on the adapted version of the predictive model (at block 715). As noted above, the adapted version of the predictive model may initially be set equal to the predictive model 150, which may be represented as a probability function (e.g., a posterior probability function). Accordingly, as described herein, the predictive model 150 may be represented as the probability function $P_t(y|X)$, which may be expressed as $\bar{P}_{t+1}^0(y|X)$ for the initial sequence. The electronic processor 505 also generates a temporary predictive model ($\hat{P}_{t+1}^k(y|X)$) based on the plurality of labels and the drifted data ($x_i, \hat{y}_i^k$) (at block 718). In some embodiments, the electronic processor 505 generates the temporary predictive model similar to how the predictive model 150 was generated as described above in FIG. 7.

As illustrated in FIG. 9, the electronic processor 505 then estimates a drift ($\hat{\delta}^k(y|x_i)$) for each of the second plurality of data points (i.e., a point-wise drift) (at block 722). The drift may be based on the adapted version of the predictive model ($\bar{P}_{t+1}^k(y|X)$) and the temporary predictive model ($\hat{P}_{t+1}^k(y|X)$). For example, in some embodiments, the electronic processor 505 estimates the drift for each of the second plurality of data points (i.e., a point-wise drift) using the below equation (1).

$$\delta(y|x_i) = P^t(y|x_i) \log \frac{P^t(y|x_i)}{P^{t+1}(y|x_i)} \qquad (1)$$

where $P^t(y|x_i)$ is the probability at time t (i.e., the adapted version of the predictive model) and $P^{t+1}(y|x_i)$ is the posterior probability of the drifted data points at time t+1 (i.e., the temporary predictive model). In some embodiments, the probability $P^{t+1}(y|x_i)$ may be estimated using either the adapted version of the predictive model $\bar{P}_{t+1}^k(y|X)$ or the temporary predictive model $\hat{P}_{t+1}^k(y|X)$.

The electronic processor 505 then determines a difference, such as a Kullback-Leibler Divergence (KLD), between the adapted version of the predictive model and the temporary predictive model ($KLD_{gap}^k = D(\hat{P}_{t+1}^k(y|X) \| \bar{P}_{t+1}^k(y|X))$) (at block 725). When the difference ($KLD_{gap}^k$) is below the tolerance (defined during initialization) (at block 730), the electronic processor 505 uses the adapted version of the predictive model 150 to output labels for manufactured products (e.g., the second plurality of manufactured products) (at block 735). For example, the electronic processor 505 may override the original predictive model 150 with the adapted version of the predictive model 150 or flag the original predictive model 150 as inactive.

Alternatively, as illustrated in FIG. 9, when the difference is not below the tolerance (e.g., is equal to or above the tolerance) (at block 730), the electronic processor 505 calculates a gradient of the difference for each of the second plurality of data points ($\Delta_i^k = -\text{gradient}(KLD_{gap}^k)$) (at block 740). The electronic processor 505 then updates the estimated drifts ($\hat{\delta}^k(y|x_i)$) for each of the second plurality of data points based on the gradient calculated for each of the second plurality of data points (at block 745). For example, in some embodiments, the electronic processor 505 uses the below equation (2) to update the point-wise drifts, wherein the variable $\gamma_i^k$ represents a constant.

$$\hat{\delta}^{k+1}(y|x_i) = \hat{\delta}^k(y|x_i) + \gamma_i^k \Delta_i^k \qquad (2)$$

Based on the updated drifts, the electronic processor 505 updates the adapted version of the predictive model (at block 750). In some embodiments, the electronic processor 505 uses the below equation (3) to update the adapted version of the predictive model:

$$\bar{P}_{t+1}^{k+1}(y|x_i) = P_t(y|x_i) e^{\frac{\hat{\delta}^{k+1}(y|x_i)}{P_t(y|x_i)}} \qquad (3)$$

Using the updated adapted version of the predictive model, the electronic processor 505 updates the labels for each of the second plurality of manufactured parts (block 755). As illustrated in FIG. 9, after updating the labels (block 755), the electronic processor 505 generates a new temporary predictive model ($\hat{P}_{t+1}^k(y|X)$) based on the updated labels and the drifted data (at block 760). The electronic processor 505 then determines an updated difference between the updated adaptive version of the predictive model and the updated temporary predictive model as described above (at block 725). As also described above, when the updated difference is below the tolerance (at block 730), the electronic processor 505 sets the updated adapted version of the predictive model as the current model to use in predicting the labels of the manufactured parts (at block 735). However, when the updated difference is not below the tolerance (at block 730), the electronic processor 505 updates the drifts, the adapted version of the predictive model, and the labels again as described above. As illustrated in FIG. 9, the electronic processor 505 repeatedly performs these updates until the difference between the adapted version of the predictive model and the temporary predictive model is less than the tolerance.

Thus, as illustrated in FIG. 9, after creating an adapted version of the predictive model (at blocks 712), the adaptive tuning system 405 (i.e., the controller 410) checks the accuracy of the adapted version of the predictive model by comparing the adapted version of the predictive model with a temporary predictive model generated based on the plurality of data points (i.e., the drifted data) (at blocks 715, 718, 725 and 730). If these two models align (i.e., diverge by less than the threshold), the method 700 is complete (at block 735). Otherwise, the adaptive tuning system 405 adjusts a drift estimated for each of the plurality of data points (at blocks 740 and 745), updates the adapted version of the predictive model based on the adjusted drift for each of the plurality of data points (at block 750), and repeats the comparison process using the updated adapted version of the predictive model (blocks 760, 755, 718, 722, 725, and 730). Accordingly, the adaptive tuning system 405 iteratively adjusts the estimated drifts of each data point until an accurate adapted version of the predictive model is generated.

Figure 10:
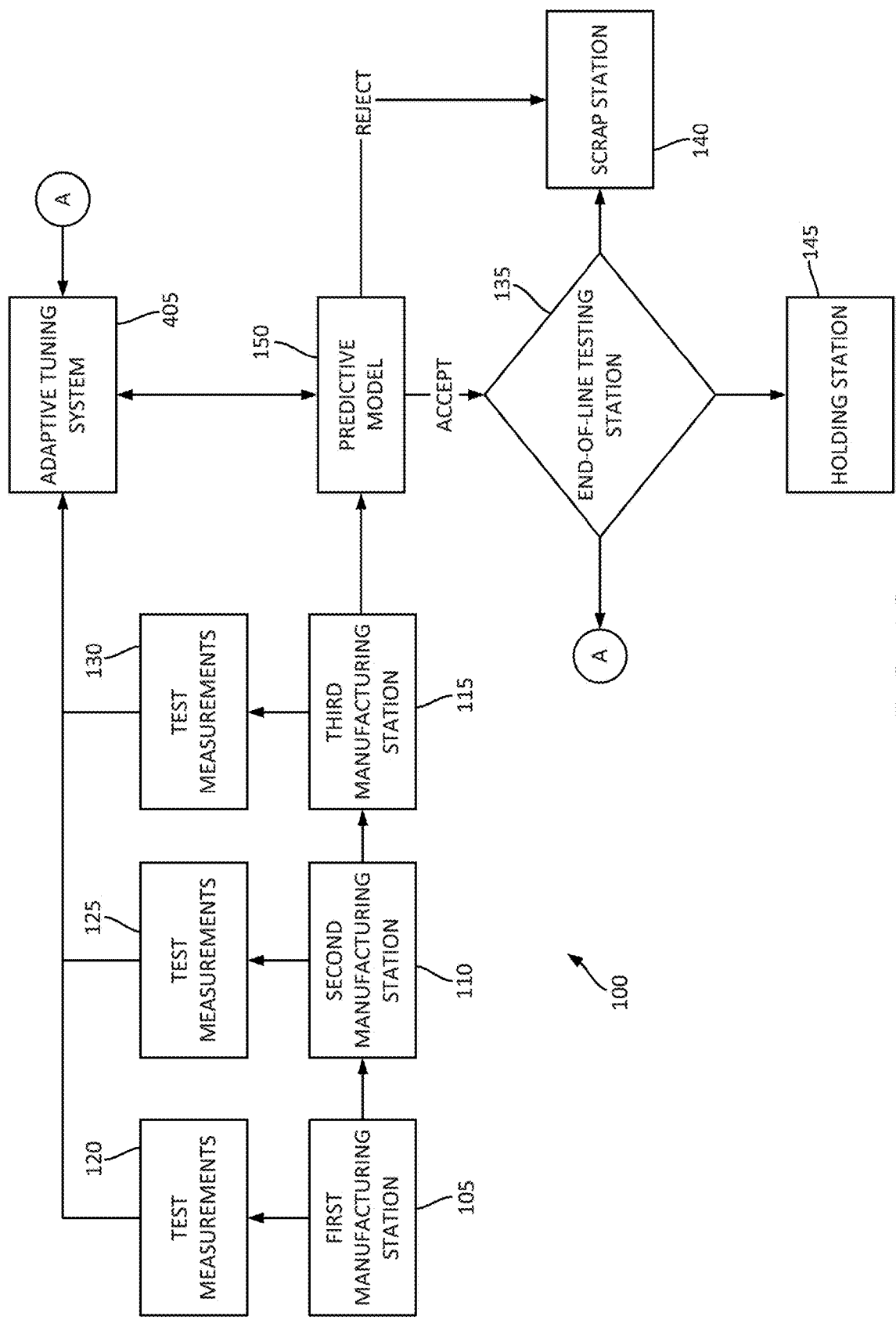
FIG. 10 is a block diagram of the manufacturing process of FIG. 4 including feedback from an end-of line testing station according to one embodiment.

In some embodiments in addition to adapting a predictive model to account for data drift as described above with respect to method 700, the controller 410 may also update the predictive model based on output from the end-of-line testing stations 135. For example, as described above, one or more of the end-of-line testing stations 135 may output a label for a manufactured part (e.g., "accept" or "reject"). As illustrated in FIG. 10, this output may be provided to the adaptive tuning system 405, which the adaptive tuning system 405 may use to perform online learning and update the predictive model. In particular, if the predictive model 150 had labeled a manufactured part as "accept," but the manufactured part was actually rejected when processed by the end-of-line testing stations 135, the predictive model 150 can learn from these discrepancies and by automatically updated accordingly.

Thus, embodiments of the invention provide, among other things, systems and methods for adaptively tuning a predictive model. For example, as described herein a predictive model may be adapted to compensate for data drift associated with a manufacturing process. In particular, embodiments of the invention may consider data generated from environments undergoing gradual drift and the availability of unlabeled batch data for online classification. This data may be used to learn from non-statutory data, estimate draft, and adapt the prediction model accordingly. Thus, embodiments of the invention provide systems and methods for adapting prediction models to non-stationary environments, such as web usage and user interest analytics; natural language processing; spam detection; analysis of financial; climate; medical; energy demand; and pricing data; and analysis of signals from autonomous robots. Similarly, embodiments of the invention provide systems and methods for adapting prediction models to manufacturing and assembly processes and technology (e.g., scrap reduction projects, test time reduction projects, part classification ("good versus bad") where gradual drift may arise from changes in suppliers of materials, wear and tear of machines and sensors, and the like.

Various features and advantages of the invention are set forth in the following claims.

What is claimed is:

1. A method of adapting a predictive model for a manufacturing process, the method comprising:
  receiving, with an electronic processor, the predictive model, the predictive model outputting a label for a manufactured part provided by the manufacturing process, wherein the label indicates whether the manufactured part is accepted or rejected, the predictive model trained using a first plurality of data points associated with a first plurality of manufactured parts and an actual label for each of the first plurality of manufactured parts;
  receiving, with the electronic processor, a second plurality of data points associated with a second plurality of manufactured parts;
  determining, with the predictive model, a first predicted label for each of the second plurality of manufactured part;
  estimating, with the electronic processor, a drift for each of the second plurality of data points, wherein estimating the drift includes
    training a temporary predictive model using the second plurality of data points and the first predicted label for each of the second plurality of manufactured parts,
    determining, with the temporary predictive model, a second predicted label for each of the second plurality of manufactured parts, and
    comparing the first predicted label and the second predicted label to estimate the drift for each of the second plurality of data points;
  generating, with the electronic processor, an adapted version of the predictive model based on the predictive model and the drift for each of the second plurality of data points; and
  outputting, with the electronic processor, a third predicted label for each of the second plurality of manufactured parts using the adapted version of the predictive model.

2. The method of claim 1, wherein determining the first predicted label for each of the second plurality of manufactured parts includes estimating, with the electronic processor, the first predicted label for each of the second plurality of manufactured parts based on the second plurality of data points and the predictive model, wherein the first predicted label for each of second plurality of manufactured parts is indicative of whether each of the second plurality of manufactured parts are within specifications.

3. The method of claim 1, further comprising:
  comparing, with the electronic processor, the adapted version of the predictive model and the temporary predictive model to obtain a difference; and
  when the difference is greater than a threshold, updating, with the electronic processor, the adapted version of the predictive model.

4. The method of claim 3, wherein comparing the adapted version of the predictive model and the temporary predictive model to obtain the difference includes calculating a Kullback-Leibler Divergence between the adapted version of the predictive model and the temporary predictive model.

5. The method of claim 3, wherein updating the adapted version of the predictive model includes
   (a) calculating a gradient of the difference at each of the second plurality of data points;
   (b) updating the drift at each of the second plurality of data points based on the gradient at each of the second plurality of data points;
   (c) updating the adapted version of the predictive model based on the updated drift for each of the second plurality of data points to obtain an updated adapted version of the predictive model;
   (d) generating an updated predicted label for each of the second plurality of manufactured parts based on the second plurality of data points and the updated adapted version of the predictive model;
   (e) generating a new temporary predictive model based on the second plurality of data points and the updated predicted label for each of the second plurality of manufactured parts;
   (f) comparing the updated adapted version of the predictive model and the new temporary predictive model to obtain an updated difference;
   (g) when the updated difference is greater than the threshold, repeating (a) through (f); and
   (h) when the updated difference is less than the threshold, applying the updated adapted version of the predictive model.

6. The method of claim 1, wherein generating the adapted version of the predictive model based on the predictive model and the drift for each of the second plurality of data points includes
   (a) setting the adapted version of the predictive model to the predictive model;
   (b) generating a new temporary predictive model based on the second plurality of data points;
   (c) comparing the adapted version of the predictive model and the new temporary predictive model to determine a difference; and
   (d) when the difference is greater than a threshold, updating the drift for each of the second plurality of data points, updating the adapted version of the predictive model based on the updated drift for each of the second plurality of data points, and repeating (b) through (d) using the updated adapted version of the predictive model as the adapted version of the predictive model.

7. A system for adapting a predictive model for a manufacturing process, the system comprising:
   a database storing at least one of a first plurality of data points associated with a first plurality of manufactured parts and a second plurality of data point associated with a second plurality of manufactured parts; and
   a controller communicably coupled to the database, the controller including an electronic processor, the electronic processor configured to
      receive the second plurality of data points;
      receive the predictive model, the predictive model outputting a label for a manufactured part provided by the manufacturing process, wherein the label indicates whether the manufactured part is accepted or rejected, the predictive model trained using the first plurality of data points associated with the first plurality of manufactured parts and an actual label for each of the first plurality of manufactured parts;
      determine, with the predictive model, a first predicted label for each of the second plurality of manufactured parts;
      estimate a drift for each of the second plurality of data points, wherein the drift for each of the second plurality of data points is estimated by
         training a temporary predictive model using the second plurality of data points and the first predicted label for each of the second plurality of manufactured parts,
         determining, with the temporary predictive model, a second predicted label for each of the second plurality of manufactured parts, and
         comparing the first predicted label and the second predicted label to estimate the drift for each of the second plurality of data points;
      generate an adapted version of the predictive model based on the predictive model and the drift for each of the second plurality of data points; and
      output a third predicted label for each of the second plurality of manufactured parts using the adapted version of the predictive model.

8. The system of claim 7, wherein the first predicted label for each of the second plurality of manufactured parts indicates whether each of the second plurality of manufactured parts are within specifications.

9. The system of claim 7, wherein the electronic processor is further configured to
   compare the adapted version of the predictive model and the temporary predictive model to obtain a difference; and
   when the difference is greater than a threshold, update the adapted version of the predictive model.

10. The system of claim 9, wherein the electronic processor is configured to compare the adapted version of the predictive model and the temporary predictive model to obtain the difference by calculating a Kullback-Leibler Divergence between the adapted version of the predictive model and the temporary predictive model.

11. The system of claim 9, wherein the electronic processor is further configured to
   (a) calculate a gradient of the difference at each of the second plurality of data points;
   (b) update the drift at each of the second plurality of data points based on the gradient at each of the second plurality of data points;
   (c) update the adapted version of the predictive model based on the updated drift for each of the second plurality of data points;
   (d) generate an updated predicted label for each of the second plurality of manufactured parts based on the second plurality of data points and the updated adapted version of the predictive model;
   (e) generate a new temporary predictive model based on the updated predicted label for each of the second plurality of manufactured parts and the second plurality of data points;
   (f) compare the updated adapted version of the predictive model and the new temporary predictive model to obtain an updated difference;
   (g) when the updated difference is greater than the threshold, repeat (a) through (f); and
   (h) when the updated difference is less than the threshold, apply the adapted version of the predictive model.

12. The system of claim 7, wherein the electronic processor is further configured to
(a) set the adapted version of the predictive model to the predictive model;
(b) generate a new temporary predictive model based on the second plurality of data points;
(c) compare the adapted version of the predictive model and the new temporary predictive model to determine a difference; and
(d) when the difference is greater than a threshold, update the drift for each of the second plurality of data points, update the adapted version of the predictive model based on the updated drift for each of the second plurality of data points, and repeat (b) through (d) using the updated adapted version of the predictive model as the adapted version of the predictive model.

13. A non-transitory computer-readable medium containing instructions that, when executed by an electronic processor, perform a set of functions comprising:
receiving a predictive model, the predictive model outputting a label for a manufactured part provided by a manufacturing process, wherein the label indicates whether the manufactured part is accepted or rejected, the predictive model trained using the first plurality of data points associated with the first plurality of manufactured parts and an actual label for each of the first plurality of manufactured parts;
receiving a second plurality of data points associated with a second plurality of manufactured parts;
determining, with the predictive model, a first predicted label for each of the second plurality of manufactured parts;
estimating a drift for each of the second plurality of data points, wherein the drift for each of the second plurality of data points is estimated by
training a temporary predictive model using the second plurality of data points and the first predicted label for each of the second plurality of manufactured parts,
determining, with the temporary predictive model, a second predicted label for each of the second plurality of manufactured parts, and
comparing the first predicted label and the second predicted label to estimate the drift for each of the second plurality of data points;
generating an adapted version of the predictive model based on the predictive model and the drift for each of the second plurality of data points; and
outputting a third predicted label for each of the second plurality of manufactured parts using the adapted version of the predictive model.

14. The non-transitory computer-readable medium of claim 13, wherein the set of functions further comprises:
comparing the adapted version of the predictive model and the temporary predictive model to obtain a difference; and
when the difference is greater than a threshold, updating the adapted version of the predictive model to obtain an updated adapted version of the predictive model.

15. The non-transitory computer-readable medium of claim 14, wherein comparing the adapted version of the predictive model and the temporary predictive model to obtain the difference includes calculating a Kullback-Leibler Divergence between the adapted version of the predictive model and the temporary predictive model.

16. The non-transitory computer-readable medium of claim 14, wherein generating the updated adapted version of the predictive model includes
(a) calculating a gradient of the difference at each of the second plurality of data points;
(b) updating the drift at each of the second plurality of data points based on the gradient at each of the second plurality of data points;
(c) updating the adapted version of the predictive model based on the updated drift for each of the second plurality of data points;
(d) generating an updated predicted label for each of the second plurality of manufactured parts based on the second plurality of data points and the updated adapted version of the predictive model, the updated predicted label for each of the second plurality of manufactured parts indicative of whether each of the second plurality of manufactured parts are within specifications;
(e) generating a new temporary predictive model based on the second plurality of data points and the updated predicted label for each of the second plurality of manufactured parts;
(f) comparing the updated adapted version of the predictive model and the new temporary predictive model to obtain an updated difference;
(g) when the updated difference is greater than the threshold, repeating (a) through (f); and
(h) when the updated difference is less than the threshold, using the adapted version of the predictive model.

17. The non-transitory computer-readable medium of claim 13, wherein updating the adapted version of the predictive model based on the predictive model and the drift for each of the second plurality of data points includes
(a) setting the adapted version of the predictive model to the predictive model;
(b) generating a new temporary predictive model based on the second plurality of data points;
(c) comparing the adapted version of the predictive model and the new temporary predictive model to determine a difference; and
(d) when the difference is greater than a threshold, updating the drift for each of the second plurality of data points, updating the adapted version of the predictive model based on the updated drift for each of the second plurality of data points, and repeating (b) through (d) using the updated adapted version of the predictive model as the adapted version of the predictive model.

* * * * *